J. F. MEDVECKY & J. B. KAUSER.
LIVE MOTION ADVERTISING DEVICE.
APPLICATION FILED FEB. 21, 1910.
982,685.
Patented Jan. 24, 1911.
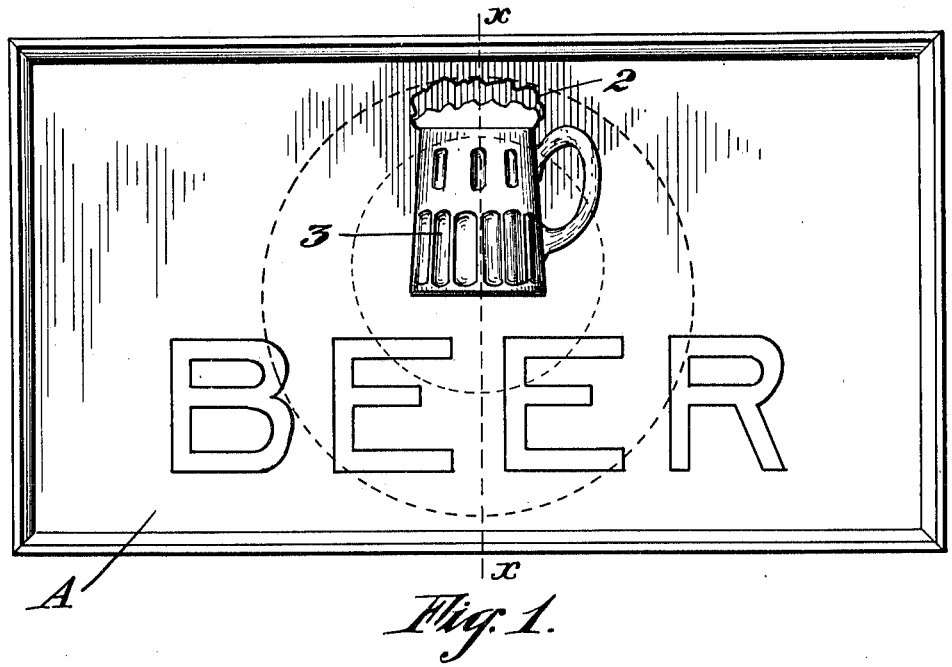
Fig. 1.
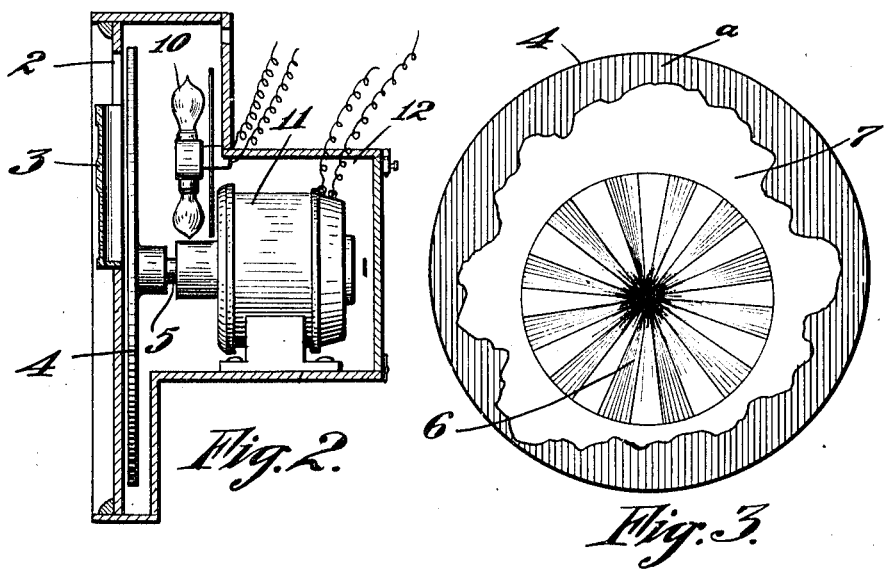
Fig. 2.
Fig. 3.
Witnesses;
R. S. Berry
Charles Pickles
Inventors
Julius F. Medvecky
and James B. Kauser
By G. H. Strong.
Their Attorney.

UNITED STATES PATENT OFFICE.

JULIUS F. MEDVECKY AND JAMES B. KAUSER, OF SAN FRANCISCO, CALIFORNIA, ASSIGNORS TO THE MODERN ADVERTISING COMPANY, OF SAN FRANCISCO, CALIFORNIA, A CORPORATION OF CALIFORNIA.

LIVE-MOTION ADVERTISING DEVICE.

982,685.   Specification of Letters Patent.   Patented Jan. 24, 1911.

Application filed February 21, 1910. Serial No. 544,983.

*To all whom it may concern:*

Be it known that we, JULIUS F. MEDVECKY and JAMES B. KAUSER, citizens of the United States, residing in the city and county of San Francisco and State of California, have invented new and useful Improvements in Live-Motion Advertising Devices, of which the following is a specification.

This invention relates to a live motion device, and particularly pertains to an advertising sign.

It is the object of this invention to provide means by which life like motion may be produced on signs such as are displayed for advertising purposes; and which is especially employed in imitating the natural movements of effervescing beverages, or flowing liquids such as wine, beer, and soda preparations.

A further object is to produce a sign which will attract attention by reason of movement thereon, and which is extremely simple in operation and construction and not liable to get out of order.

The invention consists of the parts and the combination and construction of parts as hereinafter more fully described and claimed, having reference to the accompanying drawings, in which—

Figure 1 is a front view of a sign built in accordance with the invention. Fig. 2 is a section on the line *x—x* of Fig. 1. Fig. 3 is a front view of the rotatable disk.

In the drawings A represents the field or face-plate of a sign which may be constructed in any desired shape or manner, of any suitable material, and on which any required lettering or decoration may be painted, printed, or otherwise rendered. At some convenient point on the field A an opening 2 is formed, over the lower portion of which is placed a transparent object 3, formed of such material as celluloid or glass, and in this case shaped to represent a beer mug, but any other appropriate form of object, such as a wine-glass, bottle, or the like, may be employed. The transparent object 3 is designed to project outward in front of the surface of the field A, so as to be in relief, as shown in Fig. 2.

A revoluble disk 4 mounted on a shaft 5, is placed behind the field A, the upper half of the disk being located rearward of the opening 2 and transparent object 3. This disk 4 is preferably made of glass or other translucent material, and has a design stained, painted, or otherwise formed on its outer face, which design is shown in Fig. 3. The design and its coloring on the face of the disk 4, are very important, and essential to the perfect operation of the invention, as will become apparent hereinafter.

The circular portion of the field of the disk 3, indicated at 6, is covered with a variety of contrasting colors which are laid on in radiating stripes, which gradually blend together as they meet at the center of the circular design 6. The circular portion of the design 6 is eccentric to the center of the disk 4, and has painted around its periphery an irregular border 7, preferably of a light color, usually white. The balance of the disk 4, at *a* around the border 7 is colored to correspond with the field A, usually with some dark color that will be in sharp contrast with the light border 7.

The sign may be illuminated by placing electric bulbs 10, or other sources of light, back of the upper portion of the disk 4, and in juxtaposition with the opening 2, so that the rays of light will pass therethrough.

The shaft 5, carrying the disk 4, may be revolved in any suitable manner. It is here shown as driven by electrical power direct from a motor 11, but it is obvious that any desired means for rotating the shaft 5 and disk 4 may be employed.

A casing or housing 12 is provided on the back of the sign to inclose the operative parts, as shown in Fig. 2.

The operation of the invention as shown in the drawings, is as follows: The disk 4 is caused to revolve by rotating the shaft 5 by means of the motor 11. This, by reason of the arrangement of the colors and design on the face of the disk 4, will produce the appearance of bubbling foaming beer in the transparent mug 3. The radiating contrasting colors on the field 6, when the disk 4 is in motion, represent the clear liquid in the mug 3, the contrasting colors being such that the revolving of the disk will cause them to blend and tend to assume a hue resembling liquor. The disk 4 is revolved at such speed that the radiating lines of color will not be completely blended, so that the appearance of agitation will be obtained, which appearance is greatly heightened by reason of the eccentric position of the field 6. As the disk 4 is revolved, the exposed portion of the periphery of the field 6, as seen in the glass 3, is constantly changing its position, thus giving the appearance of a rise and fall motion. The portion of irregular white field 7, which shows through the opening 2, represents the froth of the beer in the glass 3, and is caused to appear as bubbling and foaming, by reason of the change of position it assumes as the disk 4 revolves. By forming the field A of opaque material, and directing rays of light from the lamp 10 through the disk 4 and the opening 2, the effect will be greatly heightened, the portion of the disk 4 indicated at 9 being coated with an opaque color to correspond with the background on the field A so that the light will appear only through the portions 6 and 7 of the disk 4.

Having thus described our invention, what we claim and desire to secure by Letters Patent is—

1. A sign composed of a face-plate, having an object thereon, said face-plate having an opening through it outside of a marginal edge of the object, and a revoluble disk mounted rearward of said opening.

2. A sign comprising a face-plate, having a transparent object thereon, said face-plate having an opening therethrough substantially in continuation of the object, a revoluble disk mounted rearward of said opening, and a design on the face of said disk, said design having a portion which is disclosed through said object, and a second portion which is visible through said opening.

3. In a sign, a face-plate, having an opening, a transparent object in relief placed over and concealing the lower portion of said opening, the upper portion of the opening being of irregular formation, a revoluble disk mounted rearward of said opening, means for rotating the disk, and a design on the face of said disk having a part visible through the opening above said object.

4. In a sign, a face-plate, having an opening, a transparent object in relief placed over the lower portion of said opening, a revoluble disk mounted rearward of said face-plate, the center of said disk being below said opening, means for rotating said disk, and a design on the face of said disk substantially as described.

5. In a sign of the character described, a face-plate, having an opening, a transparent object in relief on the front of said face-plate, said object being placed over the lower portion of said opening, a revoluble translucent disk mounted rearward of said face-plate, the center of said disk being below said opening, a design on the face of said disk, illuminating means behind said disk, and means for rotating said disk.

6. In a sign, the combination of a revoluble disk, a face-plate in front of said disk, said face-plate having an opening exposing the upper portion of said disk, a transparent object over the lower portion of said opening, means for rotating said disk, and means to illuminate the object from the rear.

7. In a sign, the combination of a revoluble disk, a face-plate in front of said disk, said face-plate having an opening of irregular form directly exposing the upper portion of said disk, a transparent object over the lower portion of said opening, and indirectly exposing the disk, and means for rotating the disk, said disk having a design on its face.

8. In a sign, the combination of a revoluble translucent disk, a face-plate in front of said disk, said face-plate having an opening, a transparent object projecting from said face-plate over the lower portion of said opening, a design on the face of said translucent disk, means for rotating said disk, and illuminating means behind said disk.

9. In a sign, a revoluble disk, a design on the face of said disk, comprising a circular field eccentric to the center of said disk, radiating stripes of contrasting colors on said circular field, and an irregular border around the periphery of said field.

10. In a sign, a revoluble translucent disk, a design on the face of said disk comprising a circular field eccentric to the center of said disk, radiating stripes of contrasting colors on said circular field, an irregular border around the periphery of said field, and an opaque border around said irregular border.

11. In a sign, the combination with a face-plate having an opening with a transparent object covering a part only of said opening, of a revoluble translucent disk behind the face-plate, a design on the face of said disk comprising a circular field eccentric to the center of said disk, radiating stripes of contrasting colors on said circular field, an irregular border around the periphery of said field directly visible through the opening in the face-plate, an opaque border around said irregular border, illuminating means behind said disk, and means for revolving said disk.

12. In a sign, the combination with a face-plate having an opening with a transparent object covering a part only of said opening, of a revoluble translucent disk behind the face-plate, a design on the face of said disk comprising a circular field eccentric to the center of said disk, radiating stripes of contrasting colors on said circular field, an irregular border around the periphery of said field, an opaque border around said irregular border, said opaque border and irregular border being visible through the opening in the face-plate, illuminating means behind said disk, and means for revolving said disk.

13. In a sign, a revoluble translucent disk, a design on the face of said disk comprising a circular field eccentric to the center of said disk, radiating stripes of contrasting colors on said circular field, an irregular border around the periphery of said field, an opaque border around said irregular border, illuminating means behind said disk, means for revolving said disk, a face-plate in front of said disk, said face-plate having an opening and a transparent object over said opening mounted on and projecting from the face of said face-plate.

In testimony whereof we have hereunto set our hands in the presence of two subscribing witnesses.

JULIUS F. MEDVECKY.
JAMES B. KAUSER.

Witnesses:
CHARLES A. PENFIELD,
CHARLES K. PICKLES.